C. D. Brown.
Hedge Fastener.
N° 66,209.  Patented Jul. 2, 1867.

Witnesses.
W. J. Campbell
Edw Schafer

Inventor
C. D. Brown
by
Mason Fenwick & Lawrence

United States Patent Office.

C. D. BROWN, OF TAMPICO, ILLINOIS.

Letters Patent No. 66,209, dated July 2, 1867.

---

IMPROVEMENT IN HEDGE-FASTENER.

---

The Schedule referred to in these Letters Patent and making part of the same

---

TO ALL WHOM IT MAY CONCERN:

Be it known that I, C. D. BROWN, of Tampico, in the county of Whiteside, and State of Illinois, have invented a new and improved Hedge-Fastener; and I do hereby declare that the following is a full, clear, and exact description thereof, reference being had to the accompanying drawings, making a part of this specification, in which—

Similar letters of reference indicate corresponding parts in both figures.

Figure 1:
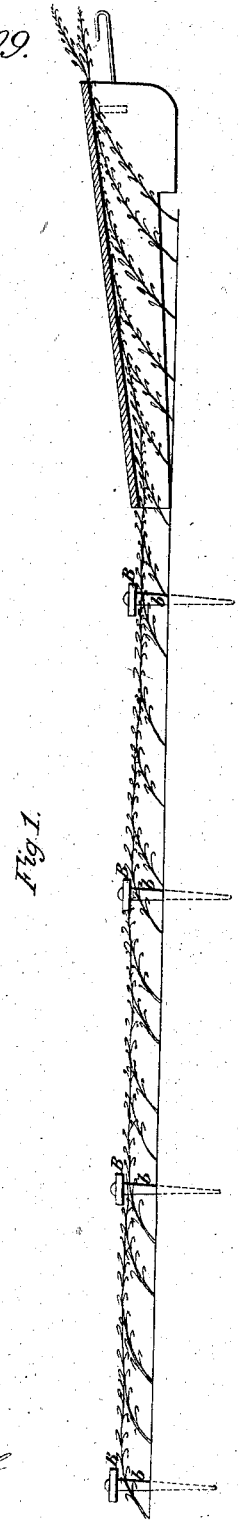
Figure 1 is a side elevation, showing the manner of holding down young plants with the fastener.
Figure 2:
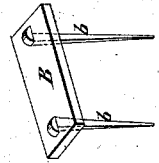
Figure 2 is a perspective view of the fastener.

The object of this invention is to provide a convenient means for fastening down young plants of the Osage orange after they have been bent down by a hedge-bender, which is described in an application for a patent, marked "A," and which is drawn along a little in advance of applying the fastening device, in order to cover the plants with mulching, so as to protect them from frost, and also to make a thickly set foundation for an early and mature fence.

To enable others skilled in the art to understand my invention, I will describe its construction and operation.

The fastening consists of a cap or link, B, and two stakes, to be applied to the hedge at intervals of from four to eight feet. The cap or link may be made of wood or iron, of any convenient form or size.

The manner of using the fastening is as follows: When the plants are old and strong enough to bend down to form a solid foundation for a fence, the bender is first drawn over the plants, making stops at the required points to apply the fastenings. The caps or links B are placed over the bent plants close in rear of the bender, and secured firmly down by driving stakes, *b b*, of wood or metal, and of any suitable length, through their ends into the earth. As the plants are long enough to reach from one fastener to another, and to lap one over another, they will be firmly held to the ground in a horizontal position.

This application of fastenings to the plants will be made in autumn, after which the plants will be covered with mulch for winter protection. In the spring the mulching is taken off and the fasteners allowed to remain until the hedge starts to grow, when it will become firmly set in its position, the roots will throw up strong shoots through the bent mass, and the stocks themselves will throw up shoots in the intermediate spaces, thus making a strong and thickly set foundation for a hedge. The fasteners are taken off after the plants commence to grow and become firmly set.

I do not desire to confine my invention to the precise construction of the fastening device herein described, as the construction may be modified and varied as circumstances require without changing the principle of my invention.

Having described my invention, what I claim as new, and desire to secure by Letters Patent, is—

The method herein described of holding down young plants, for the purpose of producing strong and thickly set hedges.

C. D. BROWN.

Witnesses:
R. L. MANGAN,
GEORGE W. SMITH.